United States Patent [19]
Huang

[11] Patent Number: 5,146,656
[45] Date of Patent: Sep. 15, 1992

[54] DEVICE FOR ATTACHING A SEAT TO A STROLLER

[76] Inventor: Ming-Tai Huang, 4 Fl., No. 302, Pai Ling Wu Rd., Taipei, Taiwan

[21] Appl. No.: 724,831

[22] Filed: Jul. 2, 1991

[51] Int. Cl.[5] .......................... A44B 17/00; A47C 7/00
[52] U.S. Cl. ..................................... 24/265 C; 24/662
[58] Field of Search ............. 24/662, 663, 664, 265 C, 24/562, 563, 545, 72.5, 72.7

[56] References Cited

U.S. PATENT DOCUMENTS

| | | | |
|---|---|---|---|
| 2,582,579 | 1/1952 | Bedford, Jr. | 24/265 C |
| 2,979,119 | 4/1961 | Kramer | 24/265 C |
| 3,089,541 | 5/1963 | Lockshin | 24/265 C |
| 3,102,318 | 9/1963 | van Buren, Jr. | 24/265 C |
| 3,175,269 | 3/1965 | Raduns et al. | 24/265 C |
| 3,438,099 | 4/1969 | Green | 24/265 C |
| 3,710,422 | 1/1973 | van Halteren | 24/265 C |
| 3,910,339 | 10/1975 | Kramer | 24/265 C |
| 4,581,793 | 4/1986 | Micklitz | 24/662 |

*Primary Examiner*—Victor N. Sakran
*Attorney, Agent, or Firm*—Fitch, Even, Tabin & Flannery

[57] ABSTRACT

A device for attaching a seat to a stroller is made of flexible material. The device includes a buckle defining a groove, a lug defining a slot, and a plurality of hook elements projecting from an inner surface of the buckle through the groove. The hook elements have a hooked end formed with a longitudinal cleft, thereby defining two spaced hooks which can be urged towards each other. The buckle grasps a structure of the stroller. The hook elements are insertable through the structure of the stroller for locking the device on the stroller. The lug means is bonded with a strip of a seat.

3 Claims, 4 Drawing Sheets

DEVICE FOR ATTACHING A SEAT TO A STROLLER

BACKGROUND OF THE INVENTION

The present invention relates to a device for attaching a seat to a stroller. More particularly, the present invention relates to a device which is easily removable from the stroller.

Conventionally, a seat is attached to a stroller with a rivet. Therefore, the seat is fixed to the stroller, so that it is very difficult to disengage the seat from the stroller for cleaning or other purposes.

Referring to FIGS. 4 and 5, there is shown a prior device for attaching a seat to a stroller. A seat 10 is formed with a bonding strip 20 formed with a through hole. A stroller structure 30 is formed with a plurality of threaded through a piece of iron 60 and engaged with the threaded hole 40, thereby bonding the strip 20 with the structure 30. Generally, over ten bolts are required to securely attach the seat 10 to the stroller. Disengaging the bolts 50 from the structure 30, the seat 10 is releasable from the stroller for cleaning or other purposes. seat to a stroller is that it is inconvenient to screw the bolts 40 to the holes 30 so as to attach the seat 10 to the stroller and to screw the bolts 40 out of the holes 30 so as to release the seat 10 from the stroller.

A second problem of the prior device for attaching a seat to a stroller is that the bolts 50 and the piece of iron 60 rust easily. Therefore, the stroller deteriorates and becomes ugly. A baby also may mouth the piece with rust out of curiosity.

A third problem of the prior device for attaching a seat to a stroller is that the piece of iron 60 which is used to protect the holes on the strip 20 will become sharp when worn out and might cut people's fingers.

SUMMARY OF THE INVENTION

To solve the above problems caused by the prior device for attaching a seat to a stroller are the objects of the present invention.

It is an object of the present invention to provide a device for attaching a seat to a stroller which can be manufactured easily.

It is another object of this invention to provide a device for attaching a seat to a stroller which can be easily engaged with or/and disengaged from a stroller.

It is still another object of this invention to provide a device for attaching a seat to a stroller which does not rust.

It is yet another object of the present invention to provide a device for attaching a seat to a stroller which can be safely operated.

These and additional objects, if not set forth specifically herein, will be readily apparent to those skilled in the art from the detailed description of embodiments below, with reference of the accompanying drawings.

DESCRIPTION OF THE INVENTION

Figure 1:
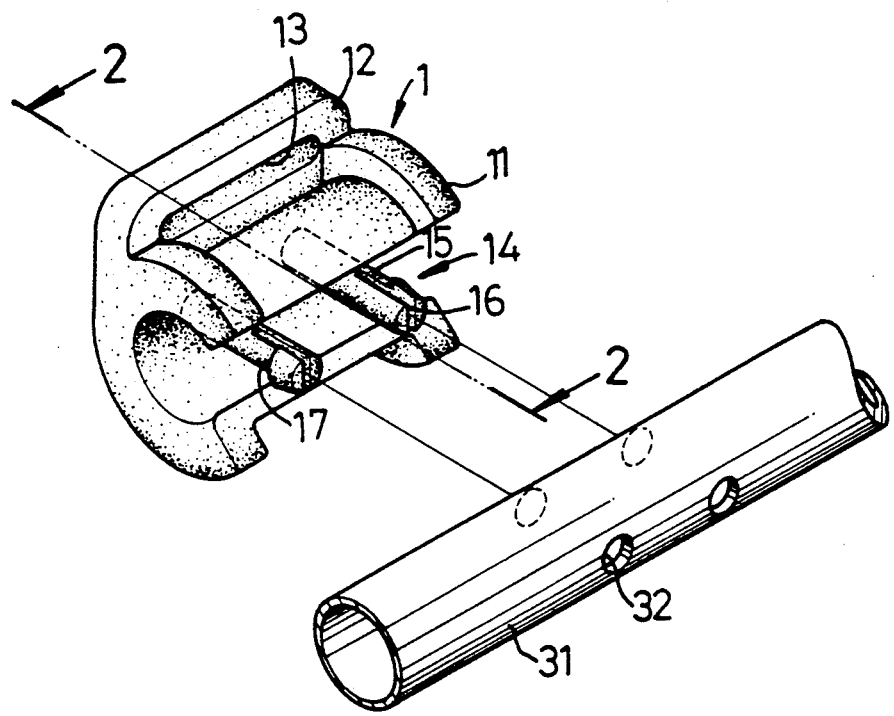
FIG. 1 is a perspective view of a device for attaching a seat to a stroller in accordance with the present invention engaging with a stroller.
Figure 3:
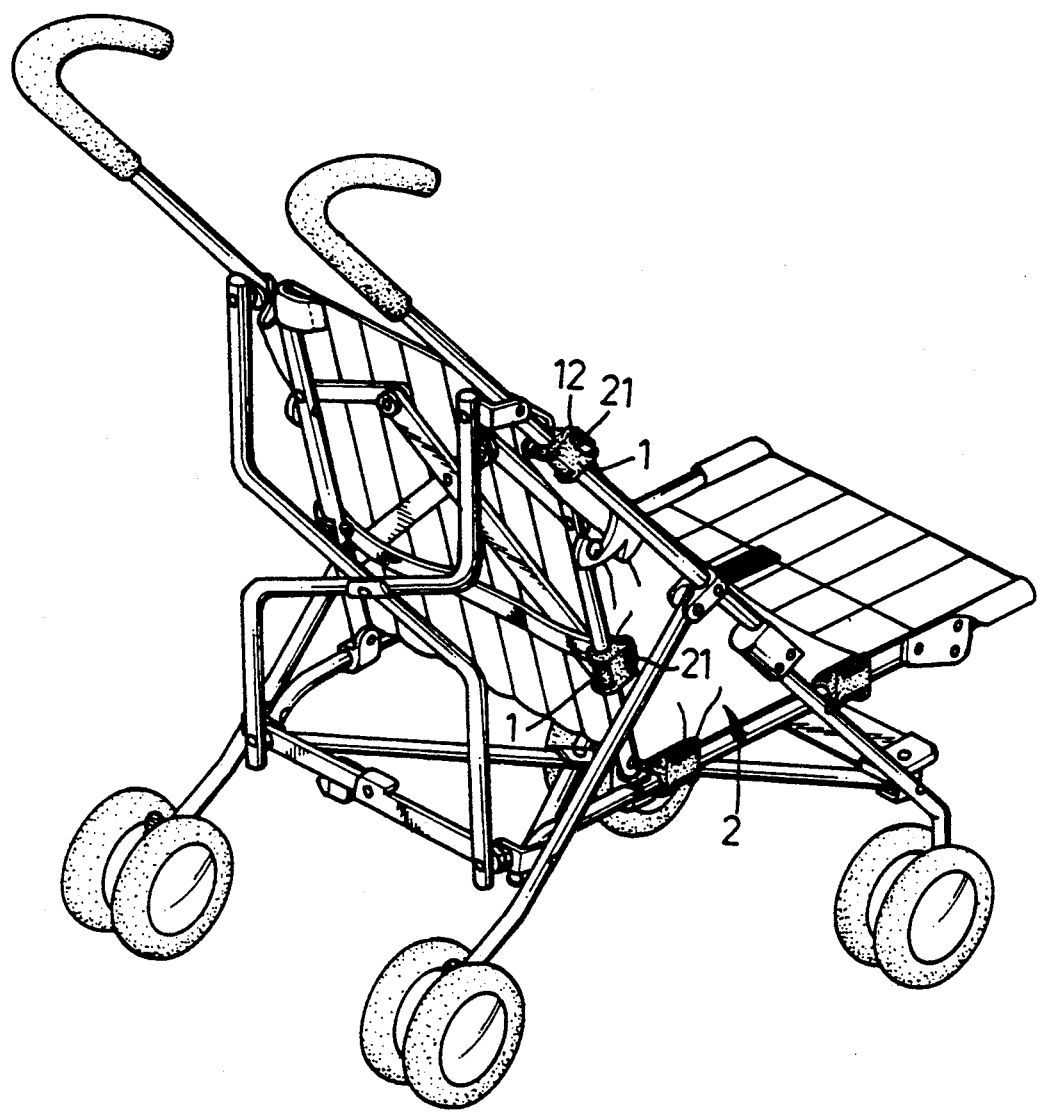
FIG. 3 is a perspective view of a stroller employing a device for attaching a seat to a stroller in accordance with the present.
Figure 4:
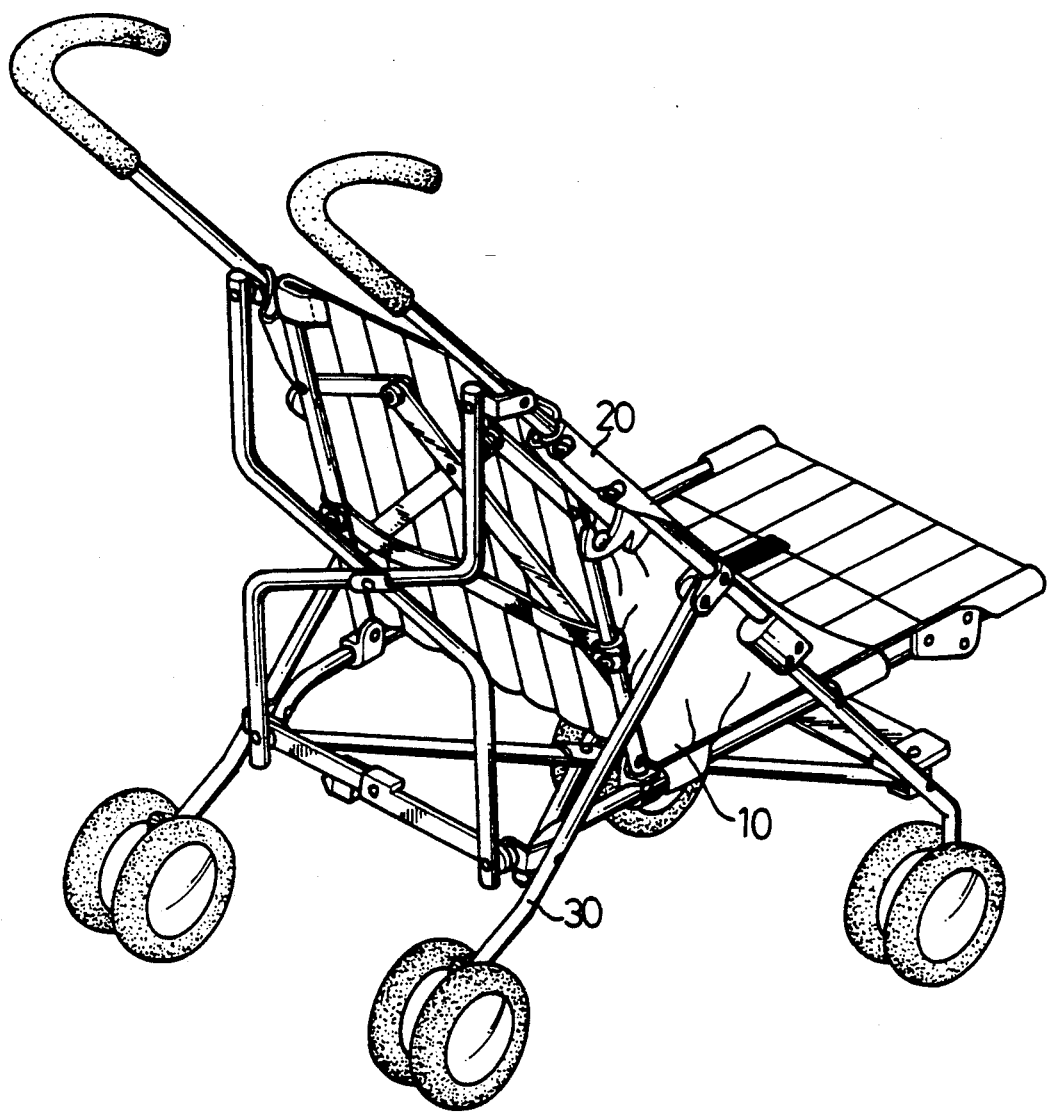
FIG. 4 is a perspective view of a stroller employing a device for attaching a seat to a stroller according to prior art.

Referring to FIG. 1, a device 1 for attaching a seat to a stroller is made of flexible material. The device 1 includes a buckle 11 defining a groove 14, a lug 12 defining a slot 13, and a plurality of hook elements 15 projecting from an inner surface of the buckle 11 through the groove 14. Each hook element 15 has a hooked end formed with a longitudinal cleft 16, thereby defining two spaced hooks 17 which can be urged towards each other. A stroller 3 includes a structure 30 (FIG. 3). A segment 31 of the structure 30 is formed with a plurality of through holes 32 each corresponding to one of the hook elements 15.

Figure 2:
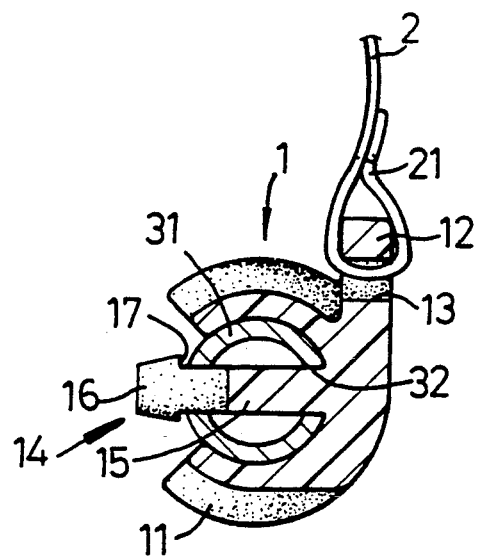
FIG. 2 is a partial cross-sectional view of a device in accordance with present invention after engaging with a stroller and with a strip fixed to a seat.
Figure 5:
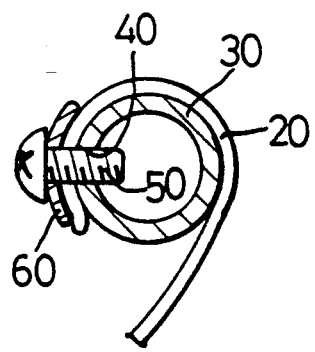
FIG. 5 is a perspective view of a device for attaching a seat to a stroller according to prior art.

Referring to FIG. 2, a strip 21 has a first end fixed to the lug 12 and a second end fixed to a seat 2. The segment 31 fits in the buckle 11 with each hook element 15 inserted through one of the through holes 32, thereby attaching the seat 2 to the stroller 3.

To release the seat 2, a user urges the two spaced hooks 17 towards each other, thus allowing the hook elements 15 to be disengaged from the through holes 33, thereby releasing the seat 2 from the stroller 3.

While the present invention has been explained in relation to its preferred embodiment, it is to be understood that various variations thereof will be apparent to those skilled in the art upon reading this specification. Therefore, the invention disclosed herein is intended to cover all such variations as shall fall within the scope of the appended claims.

What I claim is:

1. A device for attaching a seat to a stroller, said device being made of flexible material and comprising:
   a buckle for grasping an external portion of a tubular structural member of the stroller;
   hook means being fixed to said buckle and insertable through the tubular structural member of the stroller for releasably locking said buckle to the stroller; and
   a lug means being integral with said buckle and t which a strip of the seat is secured.

2. A device according to claim 1, wherein said buckle is of a cylindrical configuration compatible to the structure of the stroller and is formed with a groove so that the structure of the stroller can be urged through said groove, thereby fitting in said buckle.

3. A device according to claim 2, wherein said hook means project from an inner surface of the buckle through said groove and have a hooked end formed with a longitudinal cleft, thereby dividing said hooked end into two spaced hooks.

* * * * *

UNITED STATES PATENT AND TRADEMARK OFFICE
CERTIFICATE OF CORRECTION

PATENT NO. : 5,146,656
DATED : September 15, 1992
INVENTOR(S) : Ming-Tai HUANG It is certified that error appears in the above-identified patent and that said Letters Patent is hereby corrected as shown below:

In Column 1, line 18, after the word "threaded" insert --holes 40 at some appropriate points. A bolt 50 is inserted--.

In Column 1, line 24, after "purposes.", start a new paragraph and insert --A first problem of the prior device for attaching a--.

In Column 1, line 63, after the word "invention" insert --before--.

In Column 2, line 3, after the word "and" insert --bonding--.

In Column 2, line 6, after the word "present" insert --invention--.

In Column 2, line 51 (Claim 1, line 7) after the word "and" change "t" to read --to--.

Signed and Sealed this

Twenty-eighth Day of September, 1993

Attest:

BRUCE LEHMAN

*Attesting Officer*  *Commissioner of Patents and Trademarks*